April 16, 1968     W. SPILLMANN     3,377,800
NUCLEAR REACTOR GAS-TURBINE PLANT WITH EMERGENCY COOLING
Filed June 24, 1966
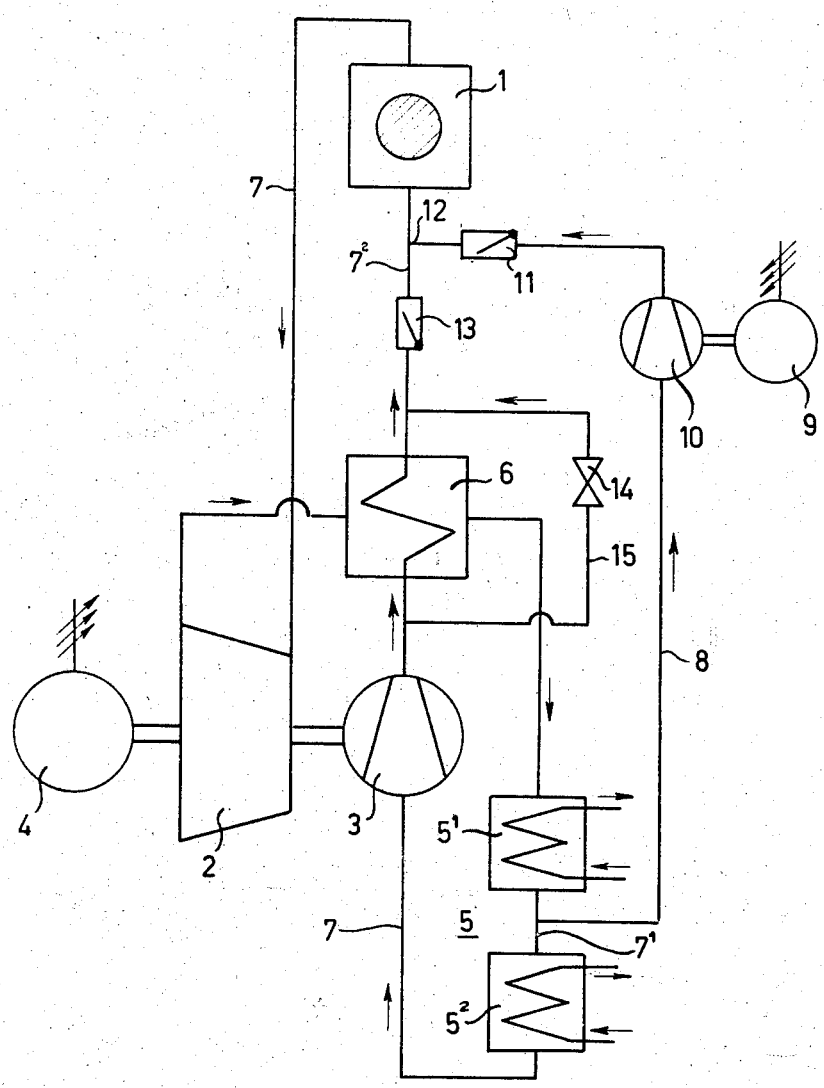
INVENTOR
Werner Spillmann
BY Dodge and Son
ATTORNEYS

3,377,800
NUCLEAR REACTOR GAS-TURBINE PLANT WITH EMERGENCY COOLING

Werner Spillmann, Kilchberg, Zurich, Switzerland, assignor to Escher Wyss Aktiengesellschaft, Zurich, Switzerland, a corporation of Switzerland
Filed June 24, 1966, Ser. No. 560,287
Claims priority, application Switzerland, Aug. 12, 1965, 11,349/65
3 Claims. (Cl. 60—59)

ABSTRACT OF THE DISCLOSURE

A gas-turbine power plant in which the working medium is heated directly in a nuclear reactor. The power plant includes a two-part cooler which is located in the working medium circuit, and an emergency cooling conduit which branches off said circuit between the two cooler parts and returns to the circuit at a point between the reactor and the compressor. This conduit contains a cooling blower and a shut-off valve, and a second shut-off valve is provided in the working medium circuit between the return point of the cooling conduit and the compressor.

---

The invention concerns a gas-turbine plant with an atomic nuclear reactor, directly heating the working medium and with a cooling conduit, provided with a cooling blower and shut-off valve for emergency reactor cooling.

Emergency cooling of the reactor is necessary in all cases, in which the gas turbine is unable to take the heat generated by the reactor.

In a known plant, in the case of emergency cooling, the two lines of the working-medium circuit between gas turbine and reactor are closed by means of valves, and a cooling conduit is provided, which has a cooler and cooling blower and connects together the parts of the lines of the working medium circuit situated on the reactor side of the valves. In the pressure part of the cooling conduit is a further valve, which in normal operation of the plant must be shut. Although the valves may be constructed as non-return valves, at least three of them are necessary, however, and one of them is situated in the hot part of the working-medium circuit leading from the reactor to the gas turbine.

It is the aim of the invention to eliminate the disadvantages described. In a gas-turbine plant of the kind hereinbefor described, for this purpose, according to the invention, the cooler of the gas-turbine plant consists of at least two parts arranged in series with respect of the through flowing working medium. Furthermore, the cooling conduit for the reactor emergency cooling, including a cooling blower and shut-off valve, is branched off the working-medium circuit between the two parts of the cooler, and returns to the working-medium circuit at a point upstream the reactor. Finally, in the direction of flow of the working-medium, in front of i.e. upstream, the return point of the cooling conduit, a shut-off valve is provided in the part of the working-medium circuit leading directly into the reactor.

The drawing, with reference to which the invention will be explained more fully, represents diagrammatically in simplified form an example of the embodiment of the subject of the invention.

The gas-turbine plant shown has an atomic nuclear reactor 1, a turbine 2, a compressor 3 and generator 4, driven by said turbine, a cooler 5 and a heat-exchanger 6. From the reactor 1, a working-medium circuit 7 leads via the turbine 2, heat-exchanger 6, cooler 5, compressor 3 and the other side of the heat-exchanger 6 back to the reactor 1.

The cooler 5 is divided into two parts $5^1$ and $5^2$. Branching off the part $7^1$ of the working-medium circuit 7, connecting together the two parts of the cooler 5 is a cooling conduit 8, including a cooling blower 10, driven by a motor 9, and a non-return valve 11. The cooling conduit 8 returns to the part $7^2$ of the working-medium circuit 7 leading directly to the reactor 1. In the direction of flow of the working-medium, in front of the return point 12 of the cooling conduit 8, a non-return valve 13 is inserted in the part $7^2$ of the working-medium circuit.

The entire plant as described is arranged in a closable chamber, not shown, containing air or protective gas.

If the working-medium of the circuit of the gas-turbine plant is unable to take off heat from the reactor, owing to damage to the machines or to leakage, the emergency cooling system 8, 9, 10 is switched on. The cooling blower 10 draws working medium from the working-medium circuit, in the event of leakage also from the chamber enclosing the plant, air or protective gas entering the working-medium circuit through the leak. The media aspirated by the cooling blower 10 are cooled on passage through one or the other parts $5^1$, $5^2$ of the cooler 5, and serve as coolant for the reactor 1. The non-return valve 13 here prevents coolant from returning to the other parts of the working-medium circuit before it has passed through the reactor 1.

In this way, the emergency cooling does not require any additional cooler (it uses the cooler of the gas-turbine plant, which cooler is necessary in any case), and manages with two non-return valves, which are situated in the cooler part of the working-medium circuit (in the hot line of the working-medium circuit leading from the reactor to the turbine, no valve is necessary).

Connected to the part of the working-medium circuit 7 leading from the compressor 3 via the heat-exchanger 6 to the reactor 1 is a by-pass conduit 15, by-passing the heat-exchanger 6 and closable by means of a valve 14. In opening of the valve 14, a large part of the working-medium, while by-passing the heat-exchanger 6 can thus enter cool into the reactor 1. Thus, even in the case of temperature-raising events in the reactor in normal operation of the plant, rapid reactor cooling is possible.

The two parts $5^1$, $5^2$ of the cooler 5 of the gas-turbine plant are of damage-proof construction and are large enough for all cases of emergency cooling.

Instead of the automatically operating non-return valves 11, 13, other valves may also be used, more particularly shut-off valves operated by a control device. Advantageously, the control device ensuring switching on of the emergency cooling system 8, 9, 10 or the by-pass 14, 15, will also serve as control device for such shut-off valves.

By valves are understood in the meaning of this specification all kinds of closure elements, particularly also flaps, cocks, slides. By the expression reactor is meant the heat-generating reactor itself, that is to say, the return point 12, at which the flow paths of circuit 7 and conduit 8 open into each other, may be situated inside the pressure vessel for the reactor.

What is claimed is:

1. In a nuclear thermal power plant having a closed circuit (7, $7^1$, $7^2$) for a gaseous working medium leading through compressing means (3), an atomic nuclear reactor (1), turbine means (2), and cooling means (5), in the order stated; said cooling means consisting of at least two parts ($5^1$, $5^2$) arranged in series with respect of the through flowing working medium; a cooling conduit (8) including a blower (10) and a shut-off valve (11); said cooling conduit branching off said working-medium circuit between said two cooler parts and returning to said circuit at a point (12) between said compressing means and said atomic nuclear reactor; and a second shut-off valve (13) arranged in said circuit between said compressing means and said return point of the cooling conduit.

2. The combination defined in claim 1 in which at least one of said shut-off valves (11, 13) is a non-return valve.

3. A nuclear thermal power plant as defined in claim 1 which includes a heat-exchanger (6) in said circuit having a first flow path connected to pass working-medium leaving said turbine means (2) and a second flow path located upstream of said second shut-off valve (13) and connected to pass working-medium leaving said compressing means (3); a by-pass conduit (15) at opposite ends of said second path; and a third shut-off valve (14) in the by-pass conduit.

References Cited

J. Nuclear Energy, II, 1957, vol. 5, pp. 128, 129.
Nucleonics, vol. 14, No. 3, March 1956, pp. 35, 37, 38.

REUBEN EPSTEIN, *Primary Examiner.*

UNITED STATES PATENT OFFICE
CERTIFICATE OF CORRECTION

Patent No. 3,377,800                                          April 16, 1968

Werner Spillmann

It is hereby certified that error appears in the above numbered patent requiring correction and that the said Letters Patent should read as corrected below.

Column 4, line 2, after "(15)" insert -- connected with said circuit --.

Signed and sealed this 3rd day of June 1969.

(SEAL)
Attest:

Edward M. Fletcher, Jr.
Attesting Officer

Commissioner of Patents